United States Patent
Wegert et al.

(10) Patent No.: US 11,639,779 B2
(45) Date of Patent: May 2, 2023

(54) LIGHT REFLECTION MODIFICATION FOR FIREPLACES AND OTHER PRODUCTS

(71) Applicants: SCHOTT Corporation, Elmsford, NY (US); SCHOTT AG, Mainz (DE)

(72) Inventors: Theodore A. Wegert, Louisville, KY (US); Zachary D. Wimmer, Louisville, KY (US); Falk Gabel, Schlangenbad (DE); Ulf Hoffmann, Pfungstadt (DE); Thomas Zenker, Nieder-Olm (DE); Thomas Emmerich Maldonado, Mainz (DE)

(73) Assignees: SCHOTT AG, Mainz (DE); SCHOTT CORPORATION, Elmsford, NY (US)

( * ) Notice: Subject to any disclaimer, the term of this patent is extended or adjusted under 35 U.S.C. 154(b) by 264 days.

(21) Appl. No.: 16/294,511

(22) Filed: Mar. 6, 2019

(65) Prior Publication Data

US 2019/0277468 A1      Sep. 12, 2019

Related U.S. Application Data

(60) Provisional application No. 62/639,659, filed on Mar. 7, 2018.

(51) Int. Cl.
*F24B 1/18* (2006.01)
*F21S 10/04* (2006.01)
(Continued)

(52) U.S. Cl.
CPC .......... *F21S 10/046* (2013.01); *C03C 17/225* (2013.01); *C03C 17/23* (2013.01); *C03C 17/3417* (2013.01); *F24B 1/1808* (2013.01); *F24B 1/195* (2013.01); *C03C 2217/211* (2013.01); *C03C 2217/212* (2013.01); *C03C 2217/228* (2013.01);
(Continued)

(58) Field of Classification Search
CPC ... C03C 17/225; C03C 17/23; C03C 17/3417; C03C 2217/211; C03C 2217/212; C03C 2217/228; C03C 2217/241; C03C 2217/281; C03C 2217/72; C03C 2217/734; F21S 10/046; F21W 2131/409; F24B 1/1808; F24B 1/195
See application file for complete search history.

(56) References Cited

U.S. PATENT DOCUMENTS

| 1,901,294 A | 3/1933 | Gritt |
| 4,048,978 A | 9/1977 | Plumat |

(Continued)

FOREIGN PATENT DOCUMENTS

| DE | 19801079 | 11/2000 |
| DE | 102017102377 | * 1/2018 |
| GB | 2411228 | 8/2005 |

OTHER PUBLICATIONS

Napi, "Fabrication of Fluorine Doped Tin Oxide (FTO) Thin Filmsusing Spray Pyrolsis Deposition Method for Transparent Conducting Oxide", ARPN Journal of Engineering and Applied Sciences, vol. 11, No. 14, Jul. 2016, pp. 3800-8804.
(Continued)

*Primary Examiner* — Yan Lan
(74) *Attorney, Agent, or Firm* — Ruggiero McAllister & McMahon LLC

(57) ABSTRACT

The present disclosure relates to products and methods for modifying the reflection of a light source in a fireplace and other products.

14 Claims, 6 Drawing Sheets

(51) Int. Cl.
*C03C 17/22* (2006.01)
*C03C 17/23* (2006.01)
*C03C 17/34* (2006.01)
*F24B 1/195* (2006.01)
*F21W 131/409* (2006.01)

(52) U.S. Cl.
CPC .. *C03C 2217/241* (2013.01); *C03C 2217/281* (2013.01); *C03C 2217/72* (2013.01); *C03C 2217/734* (2013.01); *F21W 2131/409* (2013.01)

(56) References Cited

U.S. PATENT DOCUMENTS

| | | | |
|---|---|---|---|
| 5,642,580 A | 7/1997 | Hess | |
| 6,050,011 A | 4/2000 | Hess | |
| 7,041,376 B2 | 5/2006 | Shimatani | |
| 7,111,421 B2 | 9/2006 | Corry | |
| 7,322,136 B2 | 1/2008 | Chen | |
| 7,449,244 B2 * | 11/2008 | Vilato | C03C 10/00 428/432 |
| 7,770,312 B2 | 8/2010 | Stinson | |
| 7,958,745 B2 | 6/2011 | Waldschmidt | |
| 8,008,225 B2 | 8/2011 | Henze | |
| 8,230,626 B2 | 7/2012 | Abileah | |
| 8,573,194 B2 | 11/2013 | Henn | |
| 8,661,721 B2 | 3/2014 | Hess | |
| 8,709,606 B2 | 4/2014 | Henn | |
| 8,822,033 B2 | 9/2014 | Henn | |
| 9,500,373 B2 | 11/2016 | Gabel | |
| 10,099,206 B2 | 10/2018 | Herrmann | |
| 2005/0066960 A1 * | 3/2005 | Harp | F24C 7/004 126/519 |
| 2006/0150966 A1 | 7/2006 | Jamieson | |
| 2009/0205633 A1 | 8/2009 | Hussong | |
| 2011/0283528 A1 * | 11/2011 | Spinner | F24B 1/1957 29/726 |
| 2014/0116418 A1 | 5/2014 | Thomas | |
| 2014/0153234 A1 | 6/2014 | Knoche | |
| 2018/0222794 A1 * | 8/2018 | Henn | F24C 15/005 |

OTHER PUBLICATIONS

"Borofloat—Inspriation through Quality", 2 pages.
"Vitreous Enamel", Wikipedia, 11 pages.

* cited by examiner

LIGHT REFLECTION MODIFICATION FOR FIREPLACES AND OTHER PRODUCTS

BACKGROUND OF THE DISCLOSURE

1. Field of the Disclosure

The present disclosure relates to products that modify the light reflected from a light source. More particularly, the present disclosure relates to fireplaces that modify the light reflected from a light source.

2. Description of the Related Art

Fireplaces are used for heating a home and providing aesthetic attributes to the room in which they are placed. Fireplaces usually have a cast iron housing and a front window made of glass-ceramic for high temperature/high efficiency designs or tempered glass for low temperature units. When an observer views the internal cavity of a fireplace, the observer sees the flame generated by the fireplace. The intensity or temperature, color and aesthetic impression of the flame depend on the size and power of the flame source and the flame pattern that interacts with the surrounding logs. In high temperature and high efficiency gas fireplaces, the internal cavity liner is usually made of an insulating material, such as a porous ceramic material like vermiculite.

Insulating cavity liners are usually cast to size and shape. Surface features are then decorated on after casting. These liners may provide adequate insulation. Being porous, cast and often hand painted, these liner surfaces absorb light emitted by the flame.

A problem that current market trends seek to resolve is new ways to add beauty, imagery, texture and color to a fireplace. Examples include colored LED lighting, colored glass stones, textured metals and ceramic liners, used to differentiate and bring more aesthetic design features.

Other market trends include increased energy efficiency, commonly by reduced fuel consumption. When a manufacturer limits the fuel usage of a fireplace, other problems arise. The intensity of the generated flame is limited. Such a smaller flame is often considered a negative attribute by the consumer. Fireplace manufacturers look for ways to complement this loss of flame intensity often by adding additional light sources that mimic the flame.

SUMMARY OF THE DISCLOSURE

The present disclosure pertains to fireplaces and other products that modify light that has been reflected from a light source.

Over the past several years, certain materials have become part of the design portfolio for fireplace manufacturers. These materials include glass-ceramic, porcelain enamel, tempered soda lime glass, metal and painted materials. Problems exist with tempered glass, painted materials and porcelain because they can corrode in high humidity applications.

Glass-ceramic is typically a dark black and translucent material. Glass-ceramic can be used in a high humidity fireplace without experiencing orange peel like porcelain enamel.

While glass-ceramic provides significant resistance to harsh conditions and also provides adequate insulation, glass-ceramic only minimally reflects light from the light source. Moreover, the reflection is not a direct or "mirror-like" reflection of all features of the light source. Rather, the reflection is merely a small portion of light that is reflected. In the absence of a bright or high intensity light source, many types of glass-ceramic are often considered to be non-reflective.

What minimal light is reflected from glass-ceramic is usually limited to one spectrum and intensity of light. As a result, the image reflected on glass-ceramic usually has only one "look" or aesthetic impression.

The present disclosure provides ways to improve the spectrum of light reflected from a surface to provide better aesthetics.

The present disclosure also provides that the reflected image/light can be improved by isolating specific wavelengths and/or by separating specific colors depending on, for example, the selected substrate, its surface texture, its decoration, and/or the coating composition applied to the substrate.

The present disclosure further provides that combining certain substrates, such as glass-ceramic substrates, certain coating compositions, certain surface textures and/or certain surface decoration can create:

1. Unique reflection patterns;
2. Customized color separation/skewing of the reflected light source; and/or
3. Magnified/amplified light source reflection.

The benefits of the present disclosure are not limited to fireplaces and are not limited to a flame or any particular type of light source. The benefits are for all types of products having any light source, such as a wood burning flame, a natural gas flame, a black body light source or an electric light source, including residential and commercial fireplaces, fireboxes, stoves, infrared heaters, indoor or outdoor heaters, and any products where it can be desirable to enhance the reflected image of a light source.

DETAILED DESCRIPTION OF THE DISCLOSURE

The present disclosure pertains to fireplaces and other products that modify the light reflected from a light source.

Figure 1:
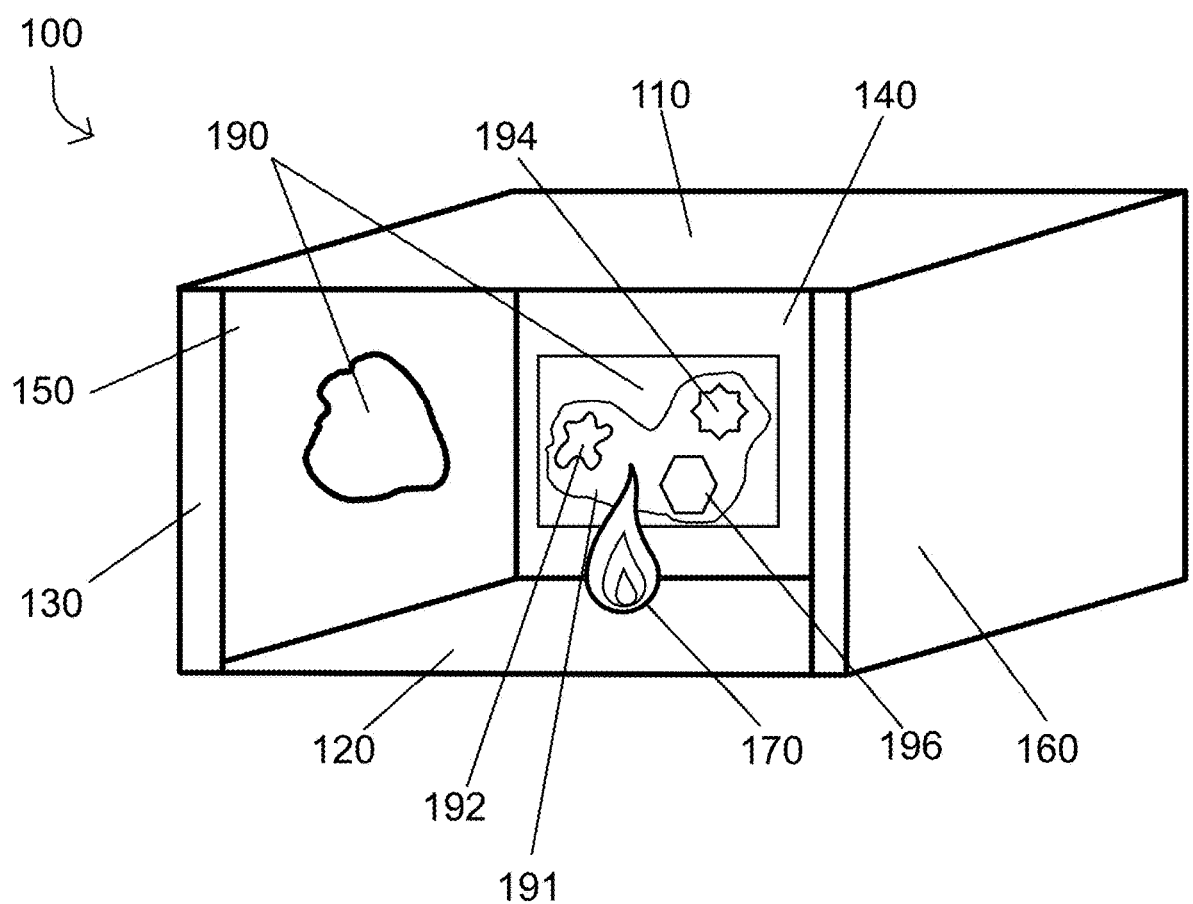
FIG. 1 shows a product that modifies light reflected from a light source according to the present disclosure.

Referring to the drawings and, in particular, to FIG. 1, there is shown a product that can be or have an enclosure generally represented by reference numeral 100. Enclosure 100 includes one or more of a top 110, a bottom 120, a front 130, a back 140, a left side 150, a right side 160, and a light source 170. Light source 170 is disposed in enclosure 100 and produces a first light with a first emission spectrum. One or more of top 110, bottom 120, back 140, left side 150 and right side 160 of enclosure 100 has a substrate 190 having a non-metallic segment 191 with a surface texture 192, a surface decoration 194 and/or a coating composition 196. Non-metallic segment 191 can reflect the first light to produce a second light with a reflected emission spectrum. The color shift Δxy between a spectrum of a normalized natural gas flame and the reflected emission spectrum can be greater than 0.007.

Substrate 190 can be smooth, textured (dimpled, ribbed, and the like) and/or have decoration (paint, and the like) that can contribute to the modification of the reflected image. Coating composition 196, surface texture 192 and surface decoration 194 can be applied to an interior facing side of substrate 190 (interior cavity of product 100), an exterior side of substrate 190, or both. In some embodiments of the product or enclosure 100, substrate 190, with or without surface texture 192, surface decoration 194 or coating composition 196, can form an entirety of top 110, bottom 120, back, left and/or right side of the product.

Coating composition 196 can be reflective. Preferably, an amount of light transmitted through coating composition 196 is less than an amount that is reflected.

Conventional fireplaces often have a transparent glass-ceramic front window or door so that the internal cavity is visible. The interior of the front window or door can be coated with a heat-reflecting composition to prevent heat loss. These windows or doors and their respective coating are essentially transparent. These windows or doors are designed to be essentially transparent so the user can see the interior of the fireplace without distortion. Consequently, such a window or door does not create a reflected image of the light source 170 that is visible to the user standing outside the product or enclosure 100.

In contrast to conventional fireplaces, substrate 190, with or without surface texture 192, surface decoration 194 or coating composition 196 of enclosure or product 100 of the present disclosure is not invisible to the user and cannot be used as a front window or door. Instead, substrate 190 reflects an enhanced image of the light source 170 with a certain color shift Δxy. Accordingly, substrate 190 can be used on the top 110, bottom 120, back 140, left side 150 and right side 160 of product 100. The reflected image contributes to the overall flame amount visible to the user, thus making the original flame appear bigger. For these reasons, substrate 190 is not intended to be part of the front window or door of the product.

The reflected light can be measured in terms of a color shift Δxy. For purposes of this disclosure, the color shift Δxy is a color shift in CIExyY (1931). In order to determine the color shift Δxy of the light/image reflected from a material or substrate 190, the color reflected by the material is compared to a reference color. To be able to reproduce the subject matter of this disclosure and compare one product to another by measuring the color shift Δxy, a normalized light emission spectrum from a natural gas flame as the reference color (i.e. the "unshifted" color) has been selected. The color shift Δxy is calculated by comparing the reflected light/image from the material/substrate with the normalized light emission spectrum from the natural gas flame. The color shift Δxy in comparison to this normalized natural gas flame light emission spectrum in certain embodiments is greater than 0.007, preferably greater than 0.010, greater than 0.030, greater than 0.050, greater than 0.070, or most preferably greater than 0.100.

The color of a natural gas flame is determined by its light emission spectrum. However, the color depends on many variables, such as the availability of oxygen, the temperature of the flame, the composition of the gas and impurities in the gas. To accurately and reproducibly calculate the color shift Δxy described herein, a normalized light emission spectrum is needed. A normalized light emission spectrum of a natural gas flame was chosen. The normalized light emission spectrum of the natural gas flame is defined as follows and shown in FIG. 2 and Table 1.

TABLE 1

Normalized light emission spectrum of natural gas flame

| k | Wavelength [nm] | Normalized Emission Intensity $I_k$ |
|---|---|---|
| 1 | 400 | 0.241379310 |
| 2 | 401 | 0.237931034 |
| 3 | 402 | 0.234482759 |
| 4 | 403 | 0.231034483 |
| 5 | 404 | 0.227586207 |
| 6 | 405 | 0.224137931 |
| 7 | 406 | 0.222988506 |
| 8 | 407 | 0.221839080 |
| 9 | 408 | 0.220689655 |
| 10 | 409 | 0.219540230 |
| 11 | 410 | 0.218390805 |
| 12 | 411 | 0.219540230 |
| 13 | 412 | 0.220689655 |
| 14 | 413 | 0.221839080 |
| 15 | 414 | 0.222988506 |
| 16 | 415 | 0.224137931 |
| 17 | 416 | 0.221839080 |
| 18 | 417 | 0.219540230 |
| 19 | 418 | 0.217241379 |
| 20 | 419 | 0.214942529 |
| 21 | 420 | 0.212643678 |
| 22 | 421 | 0.227586207 |
| 23 | 422 | 0.242528736 |
| 24 | 423 | 0.257471264 |
| 25 | 424 | 0.272413793 |
| 26 | 425 | 0.287356322 |
| 27 | 426 | 0.367816092 |
| 28 | 427 | 0.448275862 |
| 29 | 428 | 0.528735632 |
| 30 | 429 | 0.609195402 |
| 31 | 430 | 0.689655172 |
| 32 | 431 | 0.597701149 |
| 33 | 432 | 0.505747126 |
| 34 | 433 | 0.413793103 |
| 35 | 434 | 0.321839080 |
| 36 | 435 | 0.229885057 |
| 37 | 436 | 0.218390805 |
| 38 | 437 | 0.206896552 |
| 39 | 438 | 0.195402299 |
| 40 | 439 | 0.183908046 |
| 41 | 440 | 0.172413793 |
| 42 | 441 | 0.170114943 |
| 43 | 442 | 0.167816092 |
| 44 | 443 | 0.165517241 |
| 45 | 444 | 0.163218391 |
| 46 | 445 | 0.160919540 |
| 47 | 446 | 0.160919540 |
| 48 | 447 | 0.160919540 |
| 49 | 448 | 0.160919540 |
| 50 | 449 | 0.160919540 |
| 51 | 450 | 0.160919540 |
| 52 | 451 | 0.160919540 |
| 53 | 452 | 0.160919540 |
| 54 | 453 | 0.160919540 |
| 55 | 454 | 0.160919540 |
| 56 | 455 | 0.160919540 |
| 57 | 456 | 0.162068966 |
| 58 | 457 | 0.163218391 |
| 59 | 458 | 0.164367816 |
| 60 | 459 | 0.165517241 |
| 61 | 460 | 0.166666667 |
| 62 | 461 | 0.170114943 |
| 63 | 462 | 0.173563218 |
| 64 | 463 | 0.177011494 |
| 65 | 464 | 0.180459770 |
| 66 | 465 | 0.183908046 |
| 67 | 466 | 0.197701149 |
| 68 | 467 | 0.211494253 |
| 69 | 468 | 0.225287356 |

TABLE 1-continued

Normalized light emission spectrum of natural gas flame

| k | Wavelength [nm] | Normalized Emission Intensity $I_k$ |
|---|---|---|
| 70 | 469 | 0.239080460 |
| 71 | 470 | 0.252873563 |
| 72 | 471 | 0.229885057 |
| 73 | 472 | 0.206896552 |
| 74 | 473 | 0.183908046 |
| 75 | 474 | 0.160919540 |
| 76 | 475 | 0.137931034 |
| 77 | 476 | 0.137931034 |
| 78 | 477 | 0.137931034 |
| 79 | 478 | 0.137931034 |
| 80 | 479 | 0.137931034 |
| 81 | 480 | 0.137931034 |
| 82 | 481 | 0.137471264 |
| 83 | 482 | 0.137011494 |
| 84 | 483 | 0.136551724 |
| 85 | 484 | 0.136091954 |
| 86 | 485 | 0.135632184 |
| 87 | 486 | 0.135632184 |
| 88 | 487 | 0.135632184 |
| 89 | 488 | 0.135632184 |
| 90 | 489 | 0.135632184 |
| 91 | 490 | 0.135632184 |
| 92 | 491 | 0.135862069 |
| 93 | 492 | 0.136091954 |
| 94 | 493 | 0.136321839 |
| 95 | 494 | 0.136551724 |
| 96 | 495 | 0.136781609 |
| 97 | 496 | 0.139310345 |
| 98 | 497 | 0.141839080 |
| 99 | 498 | 0.144367816 |
| 100 | 499 | 0.146896552 |
| 101 | 500 | 0.149425287 |
| 102 | 501 | 0.156321839 |
| 103 | 502 | 0.163218391 |
| 104 | 503 | 0.170114943 |
| 105 | 504 | 0.177011494 |
| 106 | 505 | 0.183908046 |
| 107 | 506 | 0.200000000 |
| 108 | 507 | 0.216091954 |
| 109 | 508 | 0.232183908 |
| 110 | 509 | 0.248275862 |
| 111 | 510 | 0.264367816 |
| 112 | 511 | 0.298850575 |
| 113 | 512 | 0.333333333 |
| 114 | 513 | 0.367816092 |
| 115 | 514 | 0.402298851 |
| 116 | 515 | 0.436781609 |
| 117 | 516 | 0.471264368 |
| 118 | 517 | 0.310344828 |
| 119 | 518 | 0.149425287 |
| 120 | 519 | 0.150246305 |
| 121 | 520 | 0.151067323 |
| 122 | 521 | 0.151888342 |
| 123 | 522 | 0.152709360 |
| 124 | 523 | 0.153530378 |
| 125 | 524 | 0.154351396 |
| 126 | 525 | 0.155172414 |
| 127 | 526 | 0.157471264 |
| 128 | 527 | 0.159770115 |
| 129 | 528 | 0.162068966 |
| 130 | 529 | 0.164367816 |
| 131 | 530 | 0.166666667 |
| 132 | 531 | 0.168275862 |
| 133 | 532 | 0.169885057 |
| 134 | 533 | 0.171494253 |
| 135 | 534 | 0.173103448 |
| 136 | 535 | 0.174712644 |
| 137 | 536 | 0.176551724 |
| 138 | 537 | 0.178390805 |
| 139 | 538 | 0.180229885 |
| 140 | 539 | 0.182068966 |
| 141 | 540 | 0.183908046 |
| 142 | 541 | 0.187356322 |
| 143 | 542 | 0.190804598 |
| 144 | 543 | 0.194252874 |
| 145 | 544 | 0.197701149 |
| 146 | 545 | 0.201149425 |
| 147 | 546 | 0.204597701 |
| 148 | 547 | 0.208045977 |
| 149 | 548 | 0.211494253 |
| 150 | 549 | 0.214942529 |
| 151 | 550 | 0.218390805 |
| 152 | 551 | 0.225287356 |
| 153 | 552 | 0.232183908 |
| 154 | 553 | 0.239080460 |
| 155 | 554 | 0.245977011 |
| 156 | 555 | 0.252873563 |
| 157 | 556 | 0.257471264 |
| 158 | 557 | 0.262068966 |
| 159 | 558 | 0.266666667 |
| 160 | 559 | 0.271264368 |
| 161 | 560 | 0.275862069 |
| 162 | 561 | 0.266666667 |
| 163 | 562 | 0.257471264 |
| 164 | 563 | 0.248275862 |
| 165 | 564 | 0.239080460 |
| 166 | 565 | 0.229885057 |
| 167 | 566 | 0.227586207 |
| 168 | 567 | 0.225287356 |
| 169 | 568 | 0.222988506 |
| 170 | 569 | 0.220689655 |
| 171 | 570 | 0.218390805 |
| 172 | 571 | 0.220689655 |
| 173 | 572 | 0.222988506 |
| 174 | 573 | 0.225287356 |
| 175 | 574 | 0.227586207 |
| 176 | 575 | 0.229885057 |
| 177 | 576 | 0.232183908 |
| 178 | 577 | 0.234482759 |
| 179 | 578 | 0.236781609 |
| 180 | 579 | 0.239080460 |
| 181 | 580 | 0.241379310 |
| 182 | 581 | 0.244252874 |
| 183 | 582 | 0.247126437 |
| 184 | 583 | 0.250000000 |
| 185 | 584 | 0.252873563 |
| 186 | 585 | 0.256704981 |
| 187 | 586 | 0.260536398 |
| 188 | 587 | 0.264367816 |
| 189 | 588 | 0.419540230 |
| 190 | 589 | 0.574712644 |
| 191 | 590 | 0.425287356 |
| 192 | 591 | 0.275862069 |
| 193 | 592 | 0.277298851 |
| 194 | 593 | 0.278735632 |
| 195 | 594 | 0.280172414 |
| 196 | 595 | 0.281609195 |
| 197 | 596 | 0.282758621 |
| 198 | 597 | 0.283908046 |
| 199 | 598 | 0.285057471 |
| 200 | 599 | 0.286206897 |
| 201 | 600 | 0.287356322 |
| 202 | 601 | 0.289655172 |
| 203 | 602 | 0.291954023 |
| 204 | 603 | 0.294252874 |
| 205 | 604 | 0.296551724 |
| 206 | 605 | 0.298850575 |
| 207 | 606 | 0.301149425 |
| 208 | 607 | 0.303448276 |
| 209 | 608 | 0.305747126 |
| 210 | 609 | 0.308045977 |
| 211 | 610 | 0.310344828 |
| 212 | 611 | 0.312643678 |
| 213 | 612 | 0.314942529 |
| 214 | 613 | 0.317241379 |
| 215 | 614 | 0.319540230 |
| 216 | 615 | 0.321839080 |
| 217 | 616 | 0.324137931 |
| 218 | 617 | 0.326436782 |
| 219 | 618 | 0.328735632 |
| 220 | 619 | 0.331034483 |
| 221 | 620 | 0.333333333 |

TABLE 1-continued

Normalized light emission spectrum of natural gas flame

| k | Wavelength [nm] | Normalized Emission Intensity $I_k$ |
|---|---|---|
| 222 | 621 | 0.335632184 |
| 223 | 622 | 0.337931034 |
| 224 | 623 | 0.340229885 |
| 225 | 624 | 0.342528736 |
| 226 | 625 | 0.344827586 |
| 227 | 626 | 0.347126437 |
| 228 | 627 | 0.349425287 |
| 229 | 628 | 0.351724138 |
| 230 | 629 | 0.354022989 |
| 231 | 630 | 0.356321839 |
| 232 | 631 | 0.358620690 |
| 233 | 632 | 0.360919540 |
| 234 | 633 | 0.363218391 |
| 235 | 634 | 0.365517241 |
| 236 | 635 | 0.367816092 |
| 237 | 636 | 0.370114943 |
| 238 | 637 | 0.372413793 |
| 239 | 638 | 0.374712644 |
| 240 | 639 | 0.377011494 |
| 241 | 640 | 0.379310345 |
| 242 | 641 | 0.381609195 |
| 243 | 642 | 0.383908046 |
| 244 | 643 | 0.386206897 |
| 245 | 644 | 0.388505747 |
| 246 | 645 | 0.390804598 |
| 247 | 646 | 0.394252874 |
| 248 | 647 | 0.397701149 |
| 249 | 648 | 0.401149425 |
| 250 | 649 | 0.404597701 |
| 251 | 650 | 0.408045977 |
| 252 | 651 | 0.410344828 |
| 253 | 652 | 0.412643678 |
| 254 | 653 | 0.414942529 |
| 255 | 654 | 0.417241379 |
| 256 | 655 | 0.419540230 |
| 257 | 656 | 0.421839080 |
| 258 | 657 | 0.424137931 |
| 259 | 658 | 0.426436782 |
| 260 | 659 | 0.428735632 |
| 261 | 660 | 0.431034483 |
| 262 | 661 | 0.434482759 |
| 263 | 662 | 0.437931034 |
| 264 | 663 | 0.441379310 |
| 265 | 664 | 0.444827586 |
| 266 | 665 | 0.448275862 |
| 267 | 666 | 0.450574713 |
| 268 | 667 | 0.452873563 |
| 269 | 668 | 0.455172414 |
| 270 | 669 | 0.457471264 |
| 271 | 670 | 0.459770115 |
| 272 | 671 | 0.462068966 |
| 273 | 672 | 0.464367816 |
| 274 | 673 | 0.466666667 |
| 275 | 674 | 0.468965517 |
| 276 | 675 | 0.471264368 |
| 277 | 676 | 0.474712644 |
| 278 | 677 | 0.478160920 |
| 279 | 678 | 0.481609195 |
| 280 | 679 | 0.485057471 |
| 281 | 680 | 0.488505747 |
| 282 | 681 | 0.491954023 |
| 283 | 682 | 0.495402299 |
| 284 | 683 | 0.498850575 |
| 285 | 684 | 0.502298851 |
| 286 | 685 | 0.505747126 |
| 287 | 686 | 0.509195402 |
| 288 | 687 | 0.512643678 |
| 289 | 688 | 0.516091954 |
| 290 | 689 | 0.519540230 |
| 291 | 690 | 0.522988506 |
| 292 | 691 | 0.525287356 |
| 293 | 692 | 0.527586207 |
| 294 | 693 | 0.529885057 |
| 295 | 694 | 0.532183908 |
| 296 | 695 | 0.534482759 |
| 297 | 696 | 0.537931034 |
| 298 | 697 | 0.541379310 |
| 299 | 698 | 0.544827586 |
| 300 | 699 | 0.548275862 |
| 301 | 700 | 0.551724138 |
| 302 | 701 | 0.556321839 |
| 303 | 702 | 0.560919540 |
| 304 | 703 | 0.565517241 |
| 305 | 704 | 0.570114943 |
| 306 | 705 | 0.574712644 |
| 307 | 706 | 0.579310345 |
| 308 | 707 | 0.583908046 |
| 309 | 708 | 0.588505747 |
| 310 | 709 | 0.593103448 |
| 311 | 710 | 0.597701149 |
| 312 | 711 | 0.602298851 |
| 313 | 712 | 0.606896552 |
| 314 | 713 | 0.611494253 |
| 315 | 714 | 0.616091954 |
| 316 | 715 | 0.620689655 |
| 317 | 716 | 0.625287356 |
| 318 | 717 | 0.629885057 |
| 319 | 718 | 0.634482759 |
| 320 | 719 | 0.639080460 |
| 321 | 720 | 0.643678161 |
| 322 | 721 | 0.648275862 |
| 323 | 722 | 0.652873563 |
| 324 | 723 | 0.657471264 |
| 325 | 724 | 0.662068966 |
| 326 | 725 | 0.666666667 |
| 327 | 726 | 0.671264368 |
| 328 | 727 | 0.675862069 |
| 329 | 728 | 0.680459770 |
| 330 | 729 | 0.685057471 |
| 331 | 730 | 0.689655172 |
| 332 | 731 | 0.694252874 |
| 333 | 732 | 0.698850575 |
| 334 | 733 | 0.703448276 |
| 335 | 734 | 0.708045977 |
| 336 | 735 | 0.712643678 |
| 337 | 736 | 0.717241379 |
| 338 | 737 | 0.721839080 |
| 339 | 738 | 0.726436782 |
| 340 | 739 | 0.731034483 |
| 341 | 740 | 0.735632184 |
| 342 | 741 | 0.740229885 |
| 343 | 742 | 0.744827586 |
| 344 | 743 | 0.749425287 |
| 345 | 744 | 0.754022989 |
| 346 | 745 | 0.758620690 |
| 347 | 746 | 0.763218391 |
| 348 | 747 | 0.767816092 |
| 349 | 748 | 0.772413793 |
| 350 | 749 | 0.777011494 |
| 351 | 750 | 0.781609195 |
| 352 | 751 | 0.786206897 |
| 353 | 752 | 0.790804598 |
| 354 | 753 | 0.795402299 |
| 355 | 754 | 0.800000000 |
| 356 | 755 | 0.804597701 |
| 357 | 756 | 0.809195402 |
| 358 | 757 | 0.813793103 |
| 359 | 758 | 0.818390805 |
| 360 | 759 | 0.822988506 |
| 361 | 760 | 0.827586207 |
| 362 | 761 | 0.832183908 |
| 363 | 762 | 0.836781609 |
| 364 | 763 | 0.841379310 |
| 365 | 764 | 0.845977011 |
| 366 | 765 | 0.850574713 |
| 367 | 766 | 0.925287356 |
| 368 | 767 | 1.000000000 |
| 369 | 768 | 0.949425287 |
| 370 | 769 | 0.898850575 |
| 371 | 770 | 0.913793103 |
| 372 | 771 | 0.908045977 |
| 373 | 772 | 0.866995074 |

TABLE 1-continued

Normalized light emission spectrum of natural gas flame

| k | Wavelength [nm] | Normalized Emission Intensity $I_k$ |
|---|---|---|
| 374 | 773 | 0.876847291 |
| 375 | 774 | 0.886699507 |
| 376 | 775 | 0.896551724 |
| 377 | 776 | 0.903448276 |
| 378 | 777 | 0.910344828 |
| 379 | 778 | 0.917241379 |
| 380 | 779 | 0.924137931 |
| 381 | 780 | 0.931034483 |

From the spectrum in FIG. 1 and Table 1, the CIExyY color coordinates of the natural gas flame are calculated as follows. First, the X, Y, and Z tristimulus values are calculated:

$$X = \int_{350\,nm}^{780\,nm} \bar{x}(\lambda)I(\lambda)d\lambda \cong \sum_{k=1}^{401} \bar{x}_k I_k \Delta\lambda$$

$$Y = \int_{350\,nm}^{780\,nm} \bar{y}(\lambda)I(\lambda)d\lambda \cong \sum_{k=1}^{401} \bar{y}_k I_k \Delta\lambda$$

$$Z = \int_{350\,nm}^{780\,nm} \bar{z}(\lambda)I(\lambda)d\lambda \cong \sum_{k=1}^{401} \bar{z}_k I_k \Delta\lambda$$

where $\bar{x}$, $\bar{y}$, $\bar{z}$ are the well-known CIE standard observer functions for a 2 degree observer; and $\Delta\lambda=1$ nm.

From these tristimulus values, x, y and Y coordinates are calculated:

$$x = \frac{X}{X+Y+Z}$$

$$y = \frac{Y}{X+Y+Z}$$

$$Y = Y$$

The result of this calculation is the color coordinates of the defined natural gas flame, when looking directly at the flame:

$X_{flame}=0.3746$
$y_{flame}=0.3259$
$Y_{flame}=1$

Next, the color of the natural gas flame light/image after reflection from a sample is calculated. The reflected light/image color depends on the reflection spectrum of the sample in the visible wavelength range. If the reflection spectrum, i.e. the spectral reflectivity $R_k$ is known, the tristimulus values and the color of the reflected image can be calculated:

$$X = \int_{380\,nm}^{780\,nm} \bar{x}(\lambda)R(\lambda)I(\lambda)d\lambda \cong \sum_{k=1}^{401} \bar{x}_k R_k I_k \Delta\lambda$$

$$Y = \int_{380\,nm}^{780\,nm} \bar{y}(\lambda)R(\lambda)I(\lambda)d\lambda \cong \sum_{k=1}^{401} \bar{y}_k R_k I_k \Delta\lambda$$

$$Z = \int_{380\,nm}^{780\,nm} \bar{z}(\lambda)R(\lambda)I(\lambda)d\lambda \cong \sum_{k=1}^{401} \bar{z}_k R_k I_k \Delta\lambda$$

where $\bar{x}$, $\bar{y}$, $\bar{z}$ are the well-known CIE standard observer functions for a 2 degree observer, $I_k$ is the normalized emission spectrum of the natural gas flame as defined above, and $\Delta\lambda=1$ nm.

The x, y, Y coordinates are calculated from the tristimulus values X, Y and Z as described above.

The color shift $\Delta xy$ is calculated from the coordinates of natural gas flame $x_{flame}$, $y_{flame}$ and the x and y coordinates of the reflected gas flame:

$$\Delta xy = \sqrt{(x-x_{flame})^2 + (y-y_{flame})^2}$$

Figure 6:
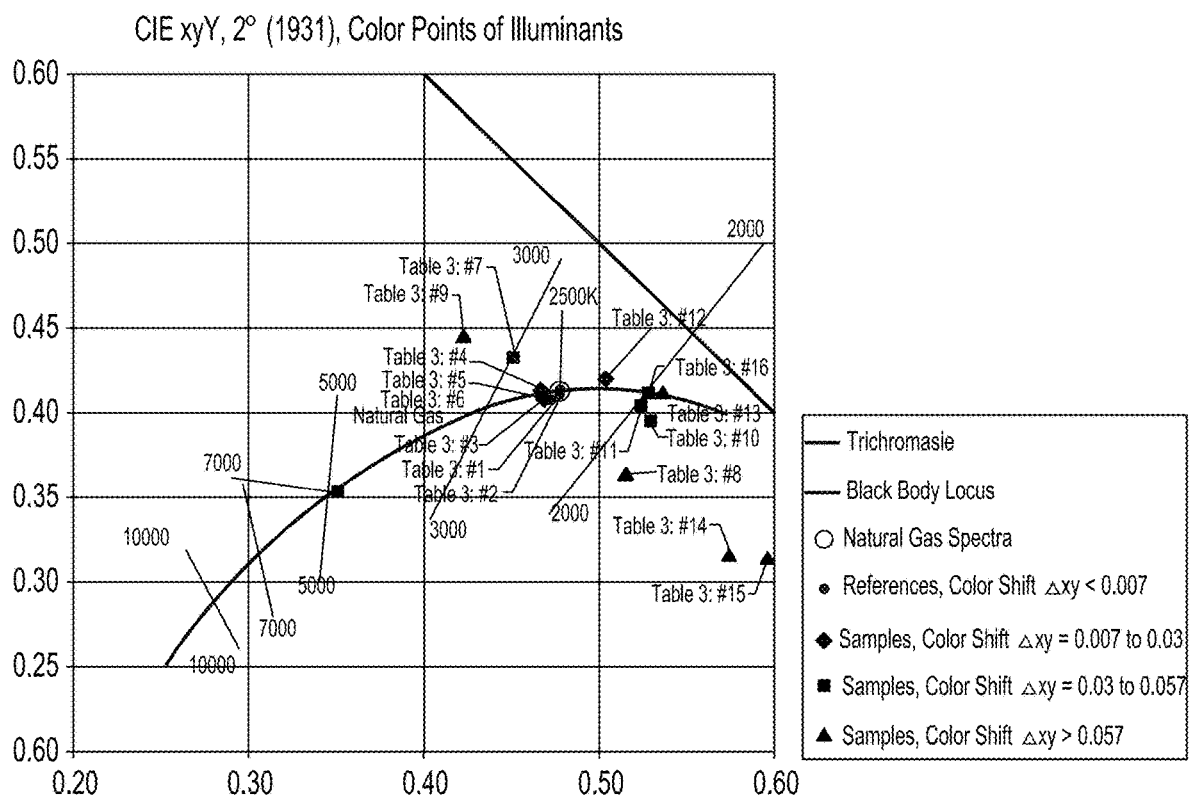
FIG. 6 illustrates the color coordinates of certain examples in a CIExyY color diagram using 2500 K black body emitter.

The magnitude of the color shift $\Delta xy$ of the reflected light/image will change if a reference light source 170 other than the normalized natural gas flame is used. For example, a different light source 170 will have a different color when viewing it directly. Consequently, the x, y, Y values of a reflected light/image of a light source 170 other than the normalized natural gas light source 170 will be different from the reflected light/image of a normalized natural gas light source 170. As an example of a different light source 170, FIG. 6 shows data from a black body radiation emitter with a color temperature of 2500 K. All of the examples show a color shift $\Delta xy$, but with a different magnitude than for the normalized natural gas flame spectrum described above. This demonstrates that the color shift $\Delta xy$ for any sample can be calculated with reference to any light source 170 with a known emission spectrum using the formulas described above.

Exemplary substrates 190 for use according to the disclosure can have a segment 191 composed of a non-metallic material such as glass-ceramic, glass, ceramic, tempered soda lime glass, quartz-glass, borosilicate glass, aluminosilicate glass, or any crystalline, amorphous, or semi-crystalline inorganic temperature resistant material, each of which can be chemically strengthened, or any combination thereof. Segment 191 can be the entire substrate 190 or less than the entire substrate. Substrate 190 can be transparent, semi-transparent, translucent or opaque. Substrate 190 can be colored or uncolored.

Exemplary coating compositions 196 for use according to the present disclosure can comprise one or more layers having a metal oxide, a nitride, an oxynitride, a silicon-based composition, or a combination thereof, including but not limited to titanium dioxide, titanium nitride, titanium oxynitride, aluminum silicon nitride, aluminum silicon oxide, silicon oxynitride, tin oxide, indium tin oxide, silicon dioxide, tin nitride, zinc oxide, aluminum oxide, aluminum oxynitride, silicon nitride, a thermocatalytic coating composition, and mixtures thereof.

Coating compositions 196 can be aluminum silicon nitride ($Al_xSi_yN_z$) and aluminum silicon oxide ($Al_xSi_yO_z$) coating compositions that contain a wide range of ratios of Al to Si. For example, the ratio of Al:Si can be between 95:5 wt % and 5:95 wt %, between 90:10 wt % and 10:90 wt %, or between 20:80 wt % and 80:20 wt %.

In some embodiments, coating composition 196 is disposed in a layer, for example as a layer of titanium nitride. The layer can be covered by a transparent protective layer. The transparent protective layer can protect the coating composition 196 from chemical attack by aggressive gaseous combustion products. The transparent protective layer can be chosen from a list of chemically resistant materials including, for example, $SiO_2$, $SiO_xN_y$, $Si_3N_4$, $Al_2O_3$, $Al_xSi_yO_z$, $Al_xSi_yN_z$, $TiO_2$, $ZrO_2$, $SnO_2$, $TaO_2$, and mixtures thereof.

Coating composition 196 can be a thermocatalytic coating composition that comprises, in some embodiments, mixed oxides of metals containing at least two of Cu, Zr, Ti and Ce. Preferably, such coating composition 196 comprises Cu and Ce. The ratio of Cu to Ce can be chosen in a wide range from about 50:50 wt % to about 15:85 wt % Cu:Ce.

Coating composition 196 can be doped to adapt optical properties, such as for example SnO2-based coatings doped with In, F, or Sb.

Coating composition 196 can be applied in one or more layers to substrate 190, for example alternating layers of titanium dioxide and silicon dioxide. Coating composition 196 can be applied to a front or light source facing side of substrate 190, a back side of substrate 190 (a side facing away from the light source), or both. When coating compositions 196 are used on both sides of the substrate, the coating compositions can either be the same or different. The texture 192 and decoration 194 can also be the same or different on each side of substrate 190.

Some coating compositions 196 can have additional benefits besides contributing to the color shift Δxy, for example the coating composition can enhance infrared reflection, can increase energy efficiency or can facilitate cleaning.

EXAMPLE 1

Exemplary combinations of substrate 190, substrate decoration 194, surface texture 192, and coating composition 196 are shown in the following tables. The coating compositions 196 can be applied in any manner known to those skilled in the art, including but not limited to wet chemistry, screen printing, dip coating, spin coating, PVD, sputter coating, a pyrolytic process, or vaporization. The scope of the disclosure and the color shift Δxy however is not limited to the combinations shown in these examples.

TABLE 2

| Substrate | Coating | Substrate Surface | Chemistry of Coating |
| --- | --- | --- | --- |
| A | Tin oxide | Smooth, dimpled or ribbed | $SnO_2$ |
| A | Aluminum silicon nitride | Smooth, dimpled or ribbed | $Al_xSi_yN_z$ |
| A | No coating | Ribbed | n/a |
| A | No coating | Ribbed | n/a |
| A | Titanium nitride | Smooth | TiN |
| A | Tin oxide | Smooth, dimpled, ribbed, nubbed or grooved | $SnO_2$ |
| A | Thermocatalytic | Smooth | Thermocatalytic coating |
| A | Titanium dioxide | Smooth, dimpled or ribbed | $TiO_2$ |
| A | One side titanium dioxide/other side thermocatalytic | Smooth or dimpled | $TiO_2$ and Thermocatalytic |
| B | Titanium nitride | Smooth or nubbed | TiN |
| B | Aluminum silicon nitride | Smooth | $Al_xSi_yN$ |
| B | Titanium dioxide | Smooth | $TiO_2$ |
| B | Multilayered titanium dioxide/silicon dioxide/titanium dioxide | Smooth | $TiO_2$—$SiO_2$—$TiO_2$ |
| B | Tin oxide | Smooth, dimpled or nubbed | $SnO_2$ |
| B | Aluminum silicon oxide | Smooth | $Al_xSi_yO_z$ |
| B | Thermocatalytic | Smooth | Thermocatalytic |
| B | One side titanium dioxide/other side thermocatalytic | Smooth or dimpled | $TiO_2$ and Thermocatalytic |
| C | Tin oxide | Smooth | $SnO_2$ |
| D | Titanium dioxide | Smooth | $TiO_2$ |
| C | Mixture of titanium nitride and silicon nitride | Smooth | TiN + SiN |
| C | Aluminum silicon nitride | Smooth | $Al_xSi_yN$ |
| C | Titanium nitride | Smooth | TiN |
| C | One side titanium dioxide/other side thermocatalytic | Smooth or dimpled | $TiO_2$ and Thermocatalytic |
| D | Tin oxide | Smooth, nubbed or dimpled | $SnO_2$ |
| D | One side titanium dioxide/other side thermocatalytic | Smooth or dimpled | $TiO_2$ and Thermocatalytic |
| E | Tin oxide | Smooth, nubbed or dimpled | $SnO_2$ |
| F | Tin oxide | Smooth, nubbed or dimpled | $SnO_2$ |
| G | Tin oxide | Smooth, nubbed or dimpled | $SnO_2$ |

Substrates
A—Black, transparent glass-ceramic, e.g. SCHOTT CERAN ® HIGHTRANS ECO
B—Uncolored, transparent glass-ceramic, e.g. SCHOTT ROBAX ®
C—White, opaque glass-ceramic, e.g. SCHOTT CERAN ® Arctic Fire Snowy
D—Milky, translucent glass-ceramic, e.g. SCHOTT NEXTREMA ® 724-5
E—Purple-black, translucent glass-ceramic, e.g. SCHOTT NEXTREMA ® 712-6
F—Grey, opaque glass-ceramic, e.g. SCHOTT NEXTREMA ® 712-8
G—Milky, translucent glass-ceramic, less translucent than D, e.g. SCHOTT CERAN ® Arctic Fire Classic

EXAMPLE 2

Figure 2:
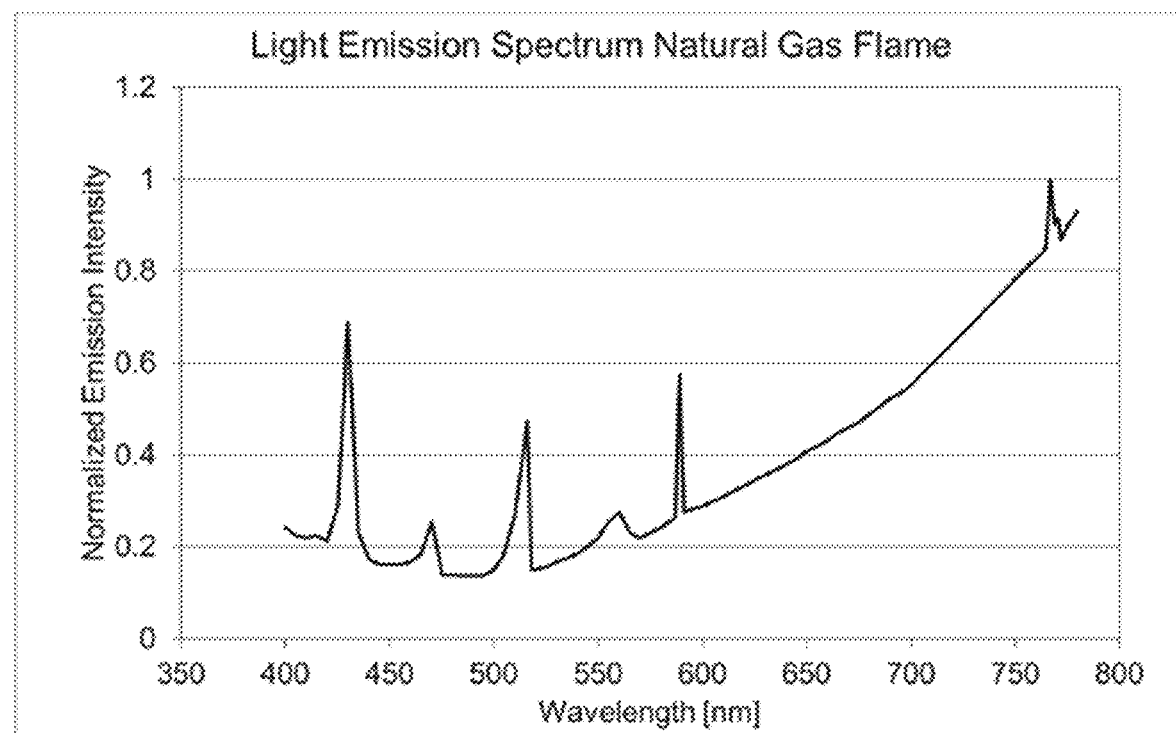
FIG. 2 shows the normalized light emission spectrum of a natural gas flame.
Figure 4:
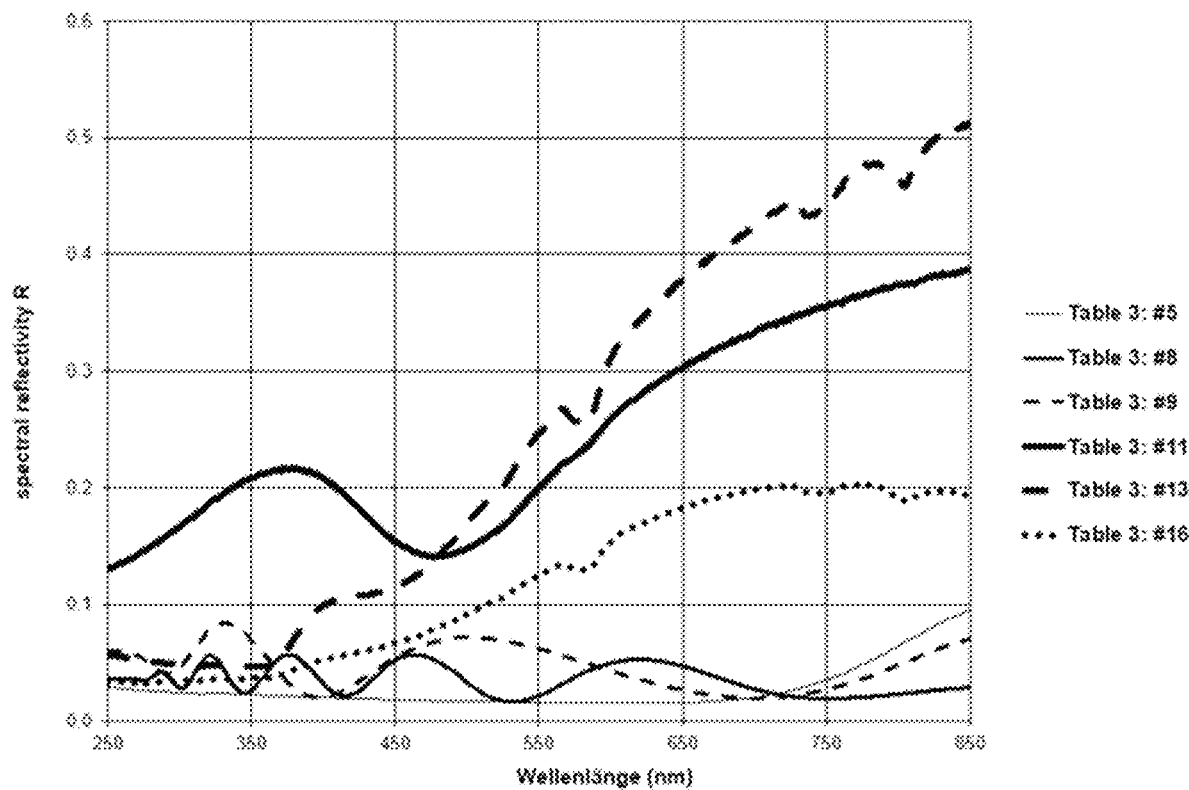
FIG. 4 illustrates the reflectance spectra of certain other examples.
Figure 5:
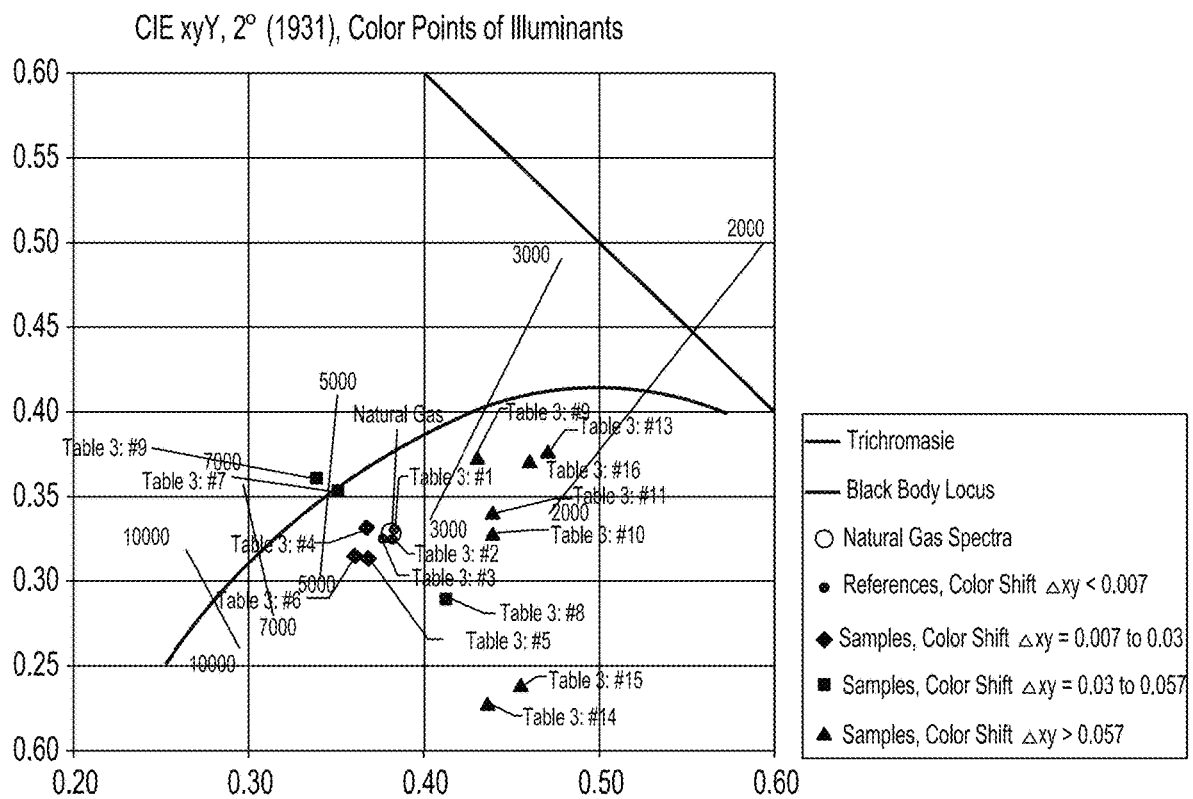
FIG. 5 illustrates the color coordinates of certain examples in the CIExyY color diagram.

Data for the color shift Δxy using a natural gas flame is shown in Table 2, FIG. 2, FIG. 4 and FIG. 5.

Comparative samples 1-3 are uncoated glass ceramic substrates, either black uncolored or white, which have a color shift Δxy<0.007.

The inventive samples 4-16 have a color shift Δxy>0.007.

The Y-value in Table 3 corresponds to the brightness of the reflection.

Some of these samples show a different color shift Δxy when viewed on the coated side vs. the uncoated side. The samples indicated with "on back" were measured with the coated side facing away from the light source, while the samples with no indication were measured with the coated side facing the light source.

Figure 3:
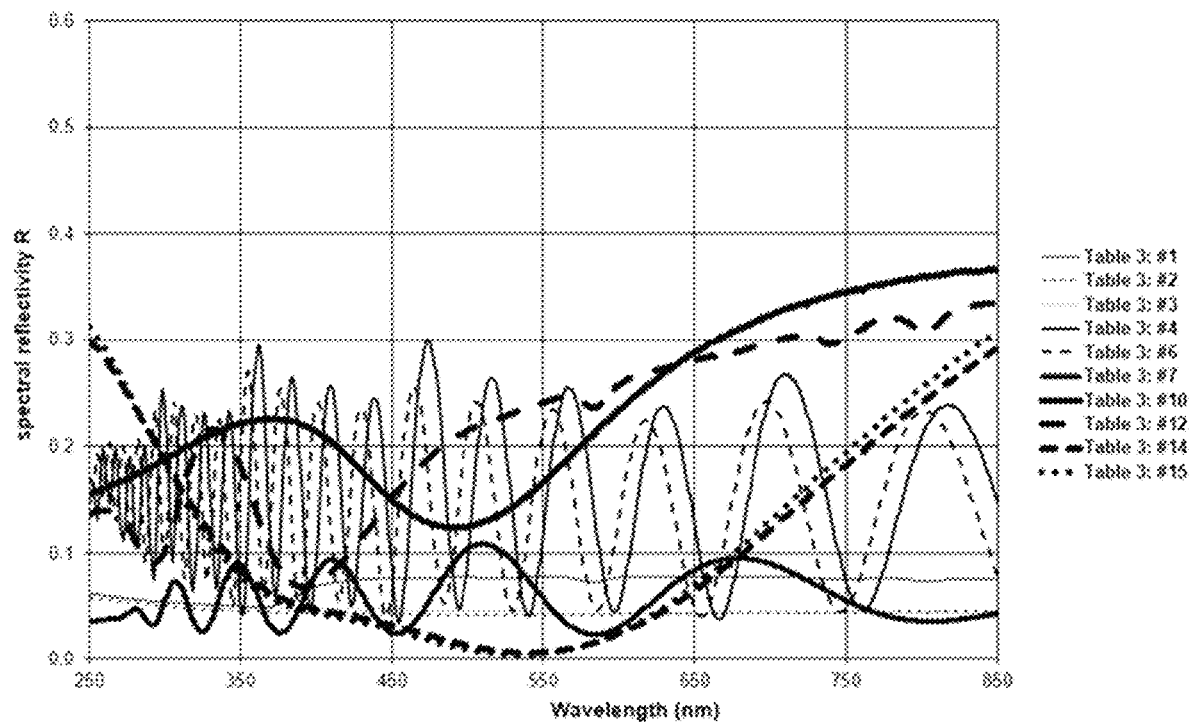
FIG. 3 illustrates the reflectance spectra of certain examples.

FIG. 3 shows the reflectance spectra in terms of spectral reflectivity R vs. wavelength for the samples with the coating on the front side. FIG. 4 shows the reflectance spectra for the samples with the coating on the back side. FIG. 5 shows the color coordinates of all samples in a CIExyY color diagram.

In FIG. 5, the natural gas flame "Gas" and the uncoated comparative samples (samples 1-3) show the same light/image/color with a color shift Δxy of almost zero. All samples with coatings reflected the natural gas flame with a significantly different color evidenced by the color shift Δxy. All samples within a specific Δxy range lie within a circle with radius Δxy in this graph, with the point "Gas" at the center of the circle.

TABLE 3

| | | | x | y | Y | Δx | Δy | Δxy |
|---|---|---|---|---|---|---|---|---|
| | | Normalized natural gas flame | 0.3813 | 0.3291 | 100% | 0.0000 | 0.0000 | 0.0000 |
| Sample | Substrate | Coating | | | | | | |
| 1 | B | Uncoated | 0.3828 | 0.3304 | 7.68% | 0.0014 | 0.0014 | 0.0020 |
| 2 | C | Uncoated | 0.3816 | 0.3260 | 4.23% | 0.0003 | −0.0031 | 0.0031 |
| 3 | A | Uncoated | 0.3767 | 0.3252 | 4.47% | −0.0046 | −0.0038 | 0.0060 |
| 4 | C | AlN:$Si_3N_4$ with Al:Si of 75:25 wt % | 0.3665 | 0.3327 | 15.84% | −0.0148 | 0.0036 | 0.0152 |
| 5 | A | TiN (on back) | 0.3668 | 0.3141 | 1.63% | −0.0145 | −0.0149 | 0.0208 |
| 6 | A | AlN:$Si_3N_4$ with Al:Si of 75:25 wt % | 0.3619 | 0.3152 | 14.74% | −0.0195 | −0.0139 | 0.0239 |
| 7 | A | F:$SnO_2$ | 0.3516 | 0.3529 | 5.60% | −0.0298 | 0.0238 | 0.0381 |
| 8 | A | F:$SnO_2$ (on back) | 0.4121 | 0.2899 | 3.58% | 0.0308 | −0.0392 | 0.0498 |
| 9 | A | $TiO_2$ (on back) and thermocatalytic (on front) | 0.3390 | 0.3605 | 5.35% | −0.0423 | 0.0315 | 0.0527 |
| 10 | A | $TiO_2$ (on front) and thermocatalytic (on back) | 0.4388 | 0.3288 | 19.57% | 0.0575 | −0.0003 | 0.0575 |
| 11 | B | $TiO_2$ (on back) and thermocatalytic (on front) | 0.4390 | 0.3414 | 22.18% | 0.0577 | 0.0123 | 0.0590 |
| 12 | B | $TiO_2$ (on front) and thermocatalytic (on back) | 0.4302 | 0.3736 | 24.39% | 0.0489 | 0.0445 | 0.0661 |
| 13 | B | TiN (on back) | 0.4719 | 0.3773 | 26.44% | 0.0905 | 0.0482 | 0.1026 |
| 14 | A | TiN | 0.4358 | 0.2277 | 1.91% | 0.0545 | −0.1013 | 0.1150 |
| 15 | B | TiN | 0.4549 | 0.2395 | 2.11% | 0.0736 | 0.0895 | 0.1159 |
| 16 | B | AlSi$O_x$ sub-stoichiometrically (on back) | 0.4602 | 0.3722 | 0.1331 | −0.0789 | −0.0432 | 0.0899 |

Substrate A—Black, transparent glass-ceramic, e.g. SCHOTT CERAN ® HIGHTRANS ECO

Substrate B—Uncolored, transparent glass-ceramic, e.g. SCHOTT ROBAX ®

Substrate C—White, opaque glass-ceramic, e.g. SCHOTT CERAN ® Arctic Fire Snowy

EXAMPLE 3

This example shows that a different light source (i.e. a 2500 K black body emitter) provides different color shift $\Delta xy$ data for the same samples used in Example 2. The 2500 K data is shown in Table 4 and FIG. 6. However, to be able to reproduce the subject matter of this disclosure and compare one product to another, the color shift $\Delta xy$ with reference to a normalized light emission spectrum from a natural gas flame is used for references purposes herein.

TABLE 4

|        |           |                                            | x      | y      | Y      | $\Delta x$ | $\Delta y$ | $\Delta xy$ |
|--------|-----------|--------------------------------------------|--------|--------|--------|---------|---------|----------|
|        |           | 2500K                                      | 0.4770 | 0.4137 | 1.0000 | 0.0000  | 0.0000  | 0.0000   |
| Sample | Substrate | Coating                                    |        |        |        |         |         |          |
| 1      | B         | Uncoated                                   | 0.4779 | 0.4134 | 0.0768 | −0.0009 | 0.0003  | 0.0009   |
| 2      | C         | Uncoated                                   | 0.4786 | 0.4118 | 0.0424 | −0.0016 | 0.0019  | 0.0025   |
| 3      | A         | Uncoated                                   | 0.4741 | 0.4129 | 0.0446 | 0.0029  | 0.0008  | 0.0030   |
| 4      | C         | AlN:Si$_3$N$_4$ with Al:Si of 75:25 wt %   | 0.4669 | 0.4142 | 0.1544 | 0.0101  | −0.0005 | 0.0101   |
| 5      | A         | TiN (on back)                              | 0.4687 | 0.4090 | 0.0162 | 0.0083  | 0.0047  | 0.0096   |
| 6      | A         | AlN:Si$_3$N$_4$ with Al:Si of 75:25 wt %   | 0.4723 | 0.4101 | 0.1433 | 0.0047  | 0.0035  | 0.0059   |
| 7      | A         | F:SnO$_2$                                  | 0.4512 | 0.4333 | 0.0532 | 0.0258  | −0.0196 | 0.0324   |
| 8      | A         | F:SnO$_2$ (on back)                        | 0.5141 | 0.3656 | 0.0368 | −0.0371 | 0.0481  | 0.0607   |
| 9      | A         | TiO$_2$ (on back) and thermocatalytic (on front) | 0.4219 | 0.4450 | 0.0518 | 0.0551  | −0.0313 | 0.0634   |
| 10     | A         | TiO$_2$ (on front) and thermocatalytic (on back) | 0.5288 | 0.3964 | 0.2023 | −0.0518 | 0.0172  | 0.0546   |
| 11     | B         | TiO$_2$ (on back) and thermocatalytic (on front) | 0.5238 | 0.4042 | 0.2285 | −0.0468 | 0.0095  | 0.0478   |
| 12     | B         | TiO$_2$ (on front) and thermocatalytic (on back) | 0.5028 | 0.4212 | 0.2471 | −0.0258 | −0.0075 | 0.0269   |
| 13     | B         | TiN (on back)                              | 0.5349 | 0.4126 | 0.2734 | −0.0579 | 0.0010  | 0.0579   |
| 14     | A         | TiN                                        | 0.5739 | 0.3160 | 0.0202 | −0.0970 | 0.0977  | 0.1376   |
| 15     | B         | TiN                                        | 0.5955 | 0.3147 | 0.0205 | −0.1185 | 0.0990  | 0.1545   |
| 16     | B         | AlSiO$_x$ sub-stoichiometrically (on back) | 0.5278 | 0.4130 | 0.1371 | −0.0508 | 0.0007  | 0.0508   |

As used herein, the term "about" is used to provide flexibility to a numerical range endpoint by providing that a given value may be "a little above" or "a little below" the endpoint. Further, where a numerical range is provided, the range is intended to include any and all numbers within the numerical range, including the end points of the range.

While the present disclosure has been described with reference to one or more exemplary embodiments, it will be understood by those skilled in the art that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiment(s) disclosed as the best mode contemplated, but that the disclosure will include all embodiments falling within the scope of the appended claims.

The invention claimed is:

1. A product comprising:
    an enclosure having one or more of a top side, a bottom side, a front side, a back side, a left side and a right side of the enclosure; and
    a source of light that produces a first light in the enclosure;
    wherein one or more of the top side, bottom side, back side, left side and right side is entirely or less than entirely a non-metallic side and comprises a coating composition,
    wherein the first light is reflected by the non-metallic side to produce a second light with a reflected emission spectrum; and
    wherein between a spectrum of a normalized natural gas flame and the reflected emission spectrum there is a color shift $\Delta xy$ that is greater than 0.007.

2. The product of claim 1, wherein the color shift $\Delta xy$ is greater than 0.030.

3. The product of claim 1, wherein the color shift $\Delta xy$ is greater than 0.070.

4. The product of claim 1, wherein the non-metallic side comprises at least one material selected from the group consisting of: glass-ceramic, glass, ceramic, tempered soda lime glass, quartz-glass, borosilicate glass, aluminosilicate glass, and any combination thereof.

5. The product of claim 1, wherein the coating composition comprises at least one material selected from the group consisting of: a metal oxide, a nitride, an oxynitride, a silicon-based composition, and any combination thereof.

6. The product of claim 1, wherein the coating comprises at least one material selected from the group consisting of:

titanium dioxide, titanium nitride, titanium oxynitride, aluminum silicon nitride, aluminum silicon oxide, silicon oxynitride, tin oxide, indium tin oxide, silicon dioxide, tin nitride, zinc oxide, aluminum oxide, aluminum oxynitride, silicon nitride, a thermocatalytic coating composition, and any combination thereof.

7. The product of claim 1, wherein the coating composition comprises aluminum silicon oxide.

8. The product of claim 1, wherein the coating composition comprises tin oxide.

9. The product of claim 1, wherein the non-metallic side is colored, transparent and coated with a coating composition comprising aluminum silicon oxide.

10. The product of claim 1, wherein the non-metallic side is uncolored, transparent and coated with a coating composition comprising aluminum silicon oxide.

11. The product of claim 1, wherein the front side of the enclosure does not have the coating composition.

12. The product of claim 1, wherein the back side is non-metallic and comprises the coating composition.

13. The product of claim 1, wherein the top side, bottom side, front side, back side, left side and right side of the enclosure each comprise a surface facing an interior of the enclosure, and wherein one of the surfaces comprises the coating composition.

14. A product comprising:
an enclosure having a substrate defining one or more of a top side, a bottom side, a front side, a back side, a left side and a right side of the enclosure; and
a source of visible light disposed in the enclosure and that produces a first visible light;
wherein the substrate is entirely or less than entirely non-metallic and comprises a coating composition on an interior facing surface of the enclosure,
wherein the first visible light is reflected by the coating composition to produce a second light with a reflected emission spectrum; and
wherein the reflected emission spectrum and a spectrum of a normalized natural gas flame has a color shift Oxy therebetween that is greater than 0.007.

* * * * *